United States Patent

Rao

Patent Number: 5,256,637
Date of Patent: Oct. 26, 1993

[54] SUPERCONDUCTING COIL BEARINGS FOR ROTOR LOAD

[75] Inventor: Dantam K. Rao, Niskayuna, N.Y.

[73] Assignee: Mechanical Technology Inc.

[21] Appl. No.: 733,304

[22] Filed: Jul. 22, 1991

[51] Int. Cl.$^5$ ............. H01B 12/00; H02K 55/00; H02K 7/09

[52] U.S. Cl. ..................... 505/1; 505/876; 310/90.5

[58] Field of Search ............ 310/52, 90.5, 256; 505/1, 876

[56] References Cited

U.S. PATENT DOCUMENTS

| | | | |
|---|---|---|---|
| 3,026,151 | 3/1962 | Buchhold | 310/90.5 |
| 3,175,405 | 3/1965 | Doyle et al. | 310/90.5 |
| 3,261,210 | 7/1966 | Buchhold | 310/90.5 |
| 3,572,854 | 3/1971 | Danby | 310/90.5 |
| 3,820,859 | 6/1974 | Brown | 310/90.5 |
| 4,797,386 | 1/1989 | Gyorgy et al. | 310/90.5 |
| 4,812,797 | 3/1989 | Jayakumar | 335/299 |
| 4,822,772 | 4/1989 | Huson | 335/216 |
| 4,843,504 | 6/1989 | Barnes | 310/10 |
| 4,886,778 | 12/1989 | Moon et al. | 310/90.5 |
| 4,892,863 | 1/1990 | Agarwala | 310/90.5 |
| 4,908,347 | 3/1990 | Denk | 310/52 |

FOREIGN PATENT DOCUMENTS

| | | | |
|---|---|---|---|
| 986568 | 3/1976 | Canada | 310/256 |
| 0381898 | 8/1990 | European Pat. Off. | 310/90.5 |
| 1283946 | 11/1968 | Fed. Rep. of Germany | 310/90.5 |
| 0008248 | 1/1979 | Japan | 310/90.5 |
| 0083141 | 5/1982 | Japan | 310/90.5 |
| 1-229118 | 9/1989 | Japan | 310/90.5 |

OTHER PUBLICATIONS

Dill, J. F. et al., "A Feasibility Study for the Application of High Temperature Superconducting Bearings to Rocket Engine Turbopumps" Conference on Advanced Earth-to-Orbit Propulsion, May, 1990.

Rao, D. K. et al., Proceedings of the 25th Intersociety Energy Conversion Engineering Conference, Aug. 1990.

*Primary Examiner*—Steven L. Stephan
*Assistant Examiner*—C. LaBalle

[57] ABSTRACT

Supercurrent bearings make use of high temperature superconducting coils to support a loaded rotor against radial or thrust loads. One such bearing is an electrodynamic bearing in which superconducting coils are used on both the stator and the rotor to develop a repulsive force. Current is induced in the rotor coils by current supplied to stator coil. Another bearing is an active magnetic bearing in which both superconducting and non-superconducting coils are used on the stator, while the rotor has a laminated secondary to develop attractive forces. The superconducting coils are used for biasing or static loads while the standard (non-superconducting) coils are used for balancing dynamic loads. The high current density of superconductors translates to higher load capacity, smaller bearing size and a lighter bearing.

11 Claims, 2 Drawing Sheets 5,256,637

SUPERCONDUCTING COIL BEARINGS FOR ROTOR LOAD

BACKGROUND OF THE INVENTION a. Field of the Invention

This invention pertains to bearing structures for supporting rotating machinery, and more particularly to superconducting bearing structures in which intense magnetic fields are generated by increasing the current density to resist radial or thrust forces.

b. Description of the Prior Art

Various superconducting bearing structures have been previously proposed for rotating machinery relying, for example, on the Meissner effect. One such structure is disclosed in U.S. Pat. No. 4,892,863. However, in these structures the superconductors carry internal currents induced by the motion of the shaft, hence small motions of the shaft induce small currents. As a result, in order to support large, heavy machinery shafts which are subject to large changes in radial or axial (thrust) forces, large bearing structures had to be supplied. This problem was amplified by the fact that the prior superconducting bearing structures include not only the superconducting members themselves but also the associated cryogenic equipment required to reduce the temperatures of these members to the required low temperatures. However, in many critical applications such as in aircraft or in spacecraft, both space and weight are primary considerations, which makes the prior art superconducting structures impractical because they will need large bearing structures to carry large dynamic loads.

U.S. Pat. No. 4,879,537 describes the use of high temperature superconductors for levitating magnets.

OBJECTIVES AND SUMMARY OF THE INVENTION

In view of the above-mentioned disadvantages of the prior art, it is an objective of the present invention to provide magnetic bearing structures suitable for use in applications with large dynamic radial or thrust forces.

A further objective is to provide magnetic bearing structures which make use of high temperature superconducting materials thereby reducing the size and complexity of the required cooling equipment.

A further objective is to provide magnetic bearing structures which are simple and easy to manufacture.

Other objectives and advantages shall become apparent from the following description of the invention. The present inventor has discovered various structures which take advantage of high temperature superconducting materials. Because these materials can be used for carrying currents larger by several orders of magnitude than the prior art structures of the Meissner effect type, the structures disclosed herein are also referred to as supercurrent-type structures.

One such supercurrent structure is an electrodynamic structure including a superconducting primary magnet coil and a superconducting secondary magnet coil. These two coils are arranged so that the currents flowing through these coils generate repulsive magnetic force directly proportional to said currents and to the ratio between the length of the coils and the clearance there between.

Another supercurrent structure is an active magnetic structure including a hybrid primary magnet composed of superconducting and standard (i.e. non-superconducting) electromagnetic coils. The secondary preferably consists of magnetic laminations. The two types of coils cooperate to apply attractive forces on the secondary. The active magnetic structure can be configured for radial or thrust loads.

DETAILED DESCRIPTION OF THE INVENTION

Figure 1:
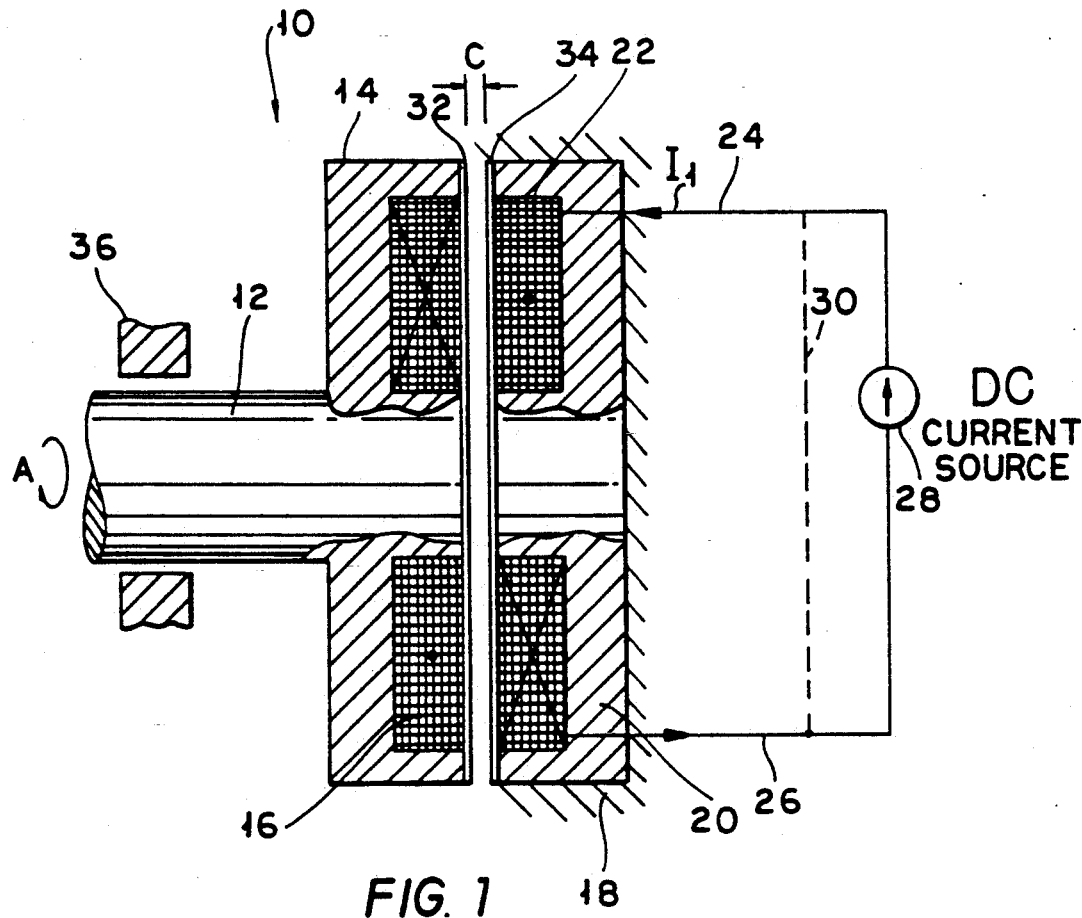
FIG. 1 shows a side sectional view of an electrodynamic supercurrent bearing constructed in accordance with this invention.

An electrodynamic supercurrent bearing structure 10 as shown in FIG. 1 consists of a rotor 12 having at one end a disk 14. Disk 14 holds a superconducting magnetic secondary coil 16 wound coaxially with respect to the longitudinal axis of rotor 12. Preferably the ends of the coil 16 are shorted to dispense with the need for brushes or any other stationary commutator devices.

In applications that do not have a shaft rotating in a cryogenic environment, the secondary coil could be replaced by permanent magnet disc structure or iron sleeve without affecting the principle of operation.

Adjacent to disk 14 there is stationary frame 18 holding a support 20. Support 20 holds a superconducting primary magnet coil 22. Initially the ends 24, 26 of coil 22 may be connected to a current source 28, or any other excitation means suitable for starting a circulation current in coil 22. Depending on the stiffness required for the bearing, the source 28 may be left connected to the coil 22 to provide a controlled current throughout the operation of the bearing. This configuration is best suited for a bearing that needs high stiffness. For bearings in which a low stiffness is required the ends 24, 26 of coil 22 may be shorted, as illustrated diagrammatically by jumper 30, to allow the persistent current to circulate through coil 22.

As rotor 12 and disk 14 turn in the direction indicated by arrow A, the current I1 through coil 22 generates a magnetic field which in turn results in a current I2 through coil 16. The two coils generate opposing magnetic fields developing a thrust force that is proportional to the product of currents I1 and I2 and to the ratio of the effective length L of the coil and the clearance C.

In order to protect the coils 16, 22 from changes in magnetic fields and to reduce ac losses, the coils may be covered by damper plates such as plates 32, 34. These plates may be made of copper, aluminum or other similar materials. They operate on the principle that changing fields induce currents and protect the superconductor.

As mentioned above the force F is repulsive force directed in parallel with the axis of rotor 12 to resist thrust load. Rotor 12 is also provided with a radial bearing 36 to resist radial loads.

The electrodynamic supercurrent bearing described above is advantageous over non-superconductive bearings in that it has a highest load capacity, reduced size and weight, smaller number of parts, low continuous power requirement due to the use of high density persistent currents and simplified controls.

Figure 2:
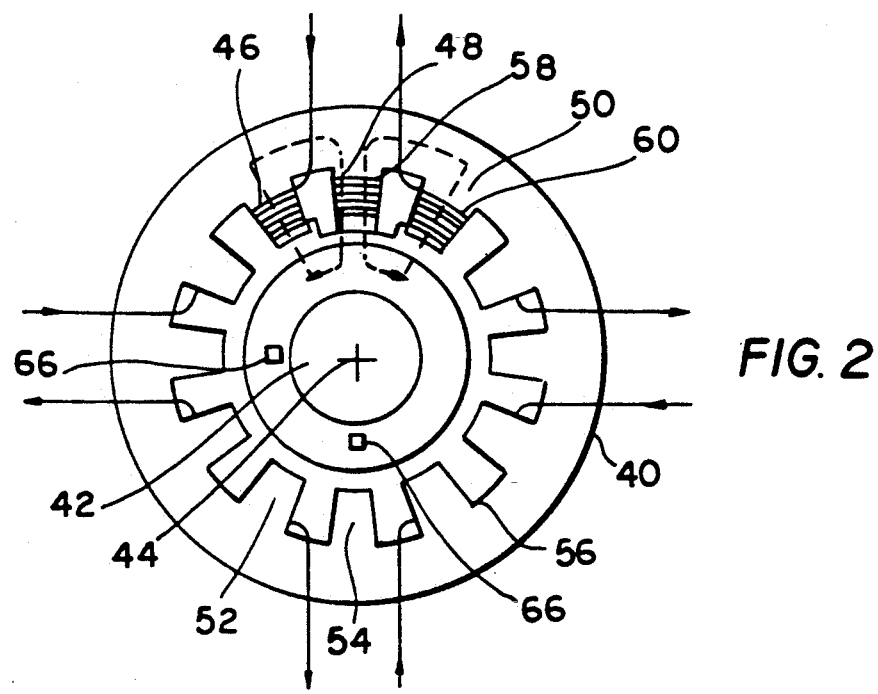
FIG. 2 shows a diagrammatic illustration of a radial active magnetic supercurrent bearing.

FIG. 2 shows an active magnetic supercurrent bearing structure that includes a stator 40 and a rotor 42 rotating about an axis 44. The stator 40 may be made of laminated soft iron and is formed to a plurality of poles such as poles 46, 48, 50, 52, 54 and 56. Some of the poles, such as poles 46, 50, 52 and 56 are used to support superconducting coil assemblies such as assembly 58, while the remaining poles are used to support standard electromagnetic coils 60. Rotor 42 includes a plurality of concentric laminations, which cooperate with the magnetic fields generated by coil assemblies 58 and coils 60 to generate attractive forces between rotor 44 and stator 40.

Figure 3:
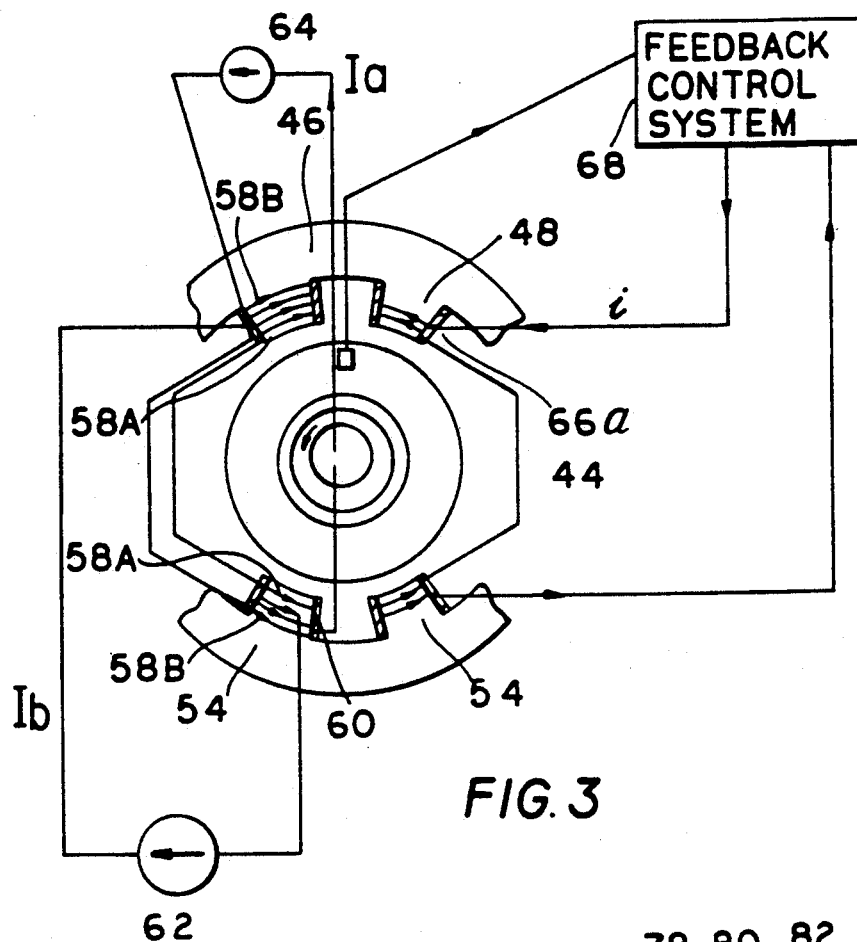
FIG. 3 shows an enlarged view of the bearing of FIG. 2.

As shown in more detail in FIG. 3, the coil assemblies 58 supported by the poles disposed near the vertical axis of the stator, such as poles 46 and 54 include a first superconducting coil 58A and a second superconducting coil 58B. Coils 58B are connected to a dc current source to provide a current Ib. For slow speed operations, the dc current source could be connected through a persistent current switch so that the superconductors carry persistent currents, reducing power consumption. Coils 58B are constructed and arranged to generate a magnetic force on rotor 42 equal to the weight of the rotor 44 and any other vertical external static loads. In other words, the static load on the bearing is supported by the magnetic field generated by coils 58B. Coils 58A are used to generate biasing forces on the rotor 42. The poles not disposed adjacent to the vertical axis of the stator 40 hold only biasing coils 58A. The biasing forces are generated by a current Ia in coils 58A. For a bearing of low stiffness, the persistent currents flowing through the superconducting coils 58A are sufficient. For bearings with a high stiffness, coils 58A may be connected to an external dc current source 64.

In order to protect the superconducting coils 58A, 58B from undesirable flux variations, the poles supporting these coils are provided with shields 66 a. The shield consists of aluminum plates and generates currents that shield the superconducting coils.

A plurality of vibration sensors 66 are disposed at various angular orientations around the rotor 42 to monitor its positions. The outputs of sensors 66 are supplied to a PDI (Position, Derivative and Integral) feedback control system 68. System 68 uses these signals to generate an ac current i fed to electromagnetic coils. Thus the coils 60 generate forces used to compensate for dynamic loads on the rotor 42 at the required stiffness and damping.

Figure 4:
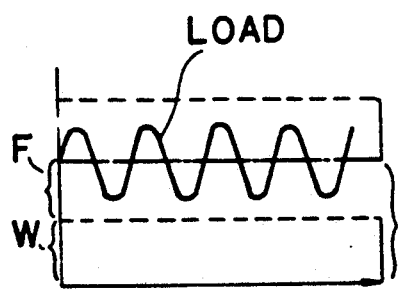
FIG. 4 shows a graph of the load distribution for the bearing of FIGS. 2 and 3.

The various forces generated by the coils in the bearing structure of FIGS. 2 and 3 is illustrated graphically in FIG. 4. Coils 58B generate the force required to support the weight W of the rotor and static loads. Coils 58A generate a biasing force Fb required to maintain the rotor aligned with its axis 44. Finally coils 60 are used for opposing dynamic loads.

The whole bearing structure is maintained at the cryogenic temperature required by superconducting coils 58A, 58B. In order to reduce losses at this temperature in the non-superconducting poles, these latter poles may be made of high purity aluminum and/or copper, depending on the cryogenic temperatures.

It should be noted that since the biasing is done by superconducting coils, when the current in coils 58A is persistent it need not be regenerated and thereby a considerable power saving is realized. Moreover, separating the current required for the bearing into two dc currents and an ac current wherein only the ac current requires a feedback system results in the linearization of the system response thereby simplifying the PDI feedback system.

Figure 5:
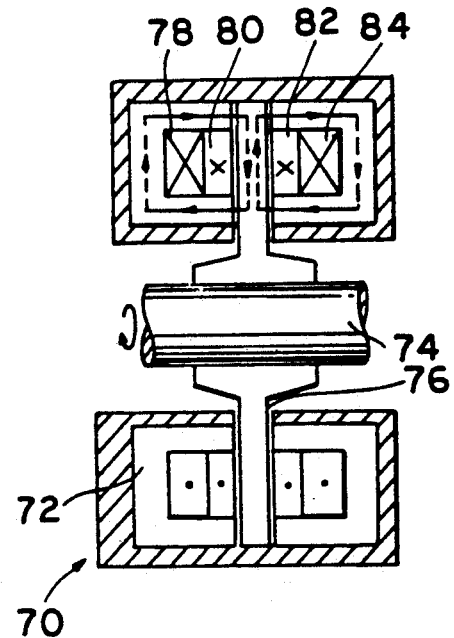
FIG. 5 shows a side-sectional view of an active supercurrent thrust bearing constructed in accordance with this invention.

FIGS. 2 and 3 illustrate an active magnetic supercurrent bearing structure for radial support. FIG. 5 shows an active magnetic supercurrent bearing structure for thrust support. This bearing 70 consists of a stator 72 and a rotor 74. A disk 76 is mounted on the rotor and is made of laminated ferro-magnetic material. The stator 72 may be made of a ferromagnetic lamination to reduce losses at cryogenic temperatures. Mounted on the stator are four axially spaced coils 78, 80, 82 and 84. These coils are wound concentrically with respect to rotor 74. As shown in FIG. 5, coils 78, 80 are disposed on one side of disk 76 and the remaining coils 82, 84 are disposed on the other side. Moreover two of these coils, such as the outer coils 78, 84 are superconducting coils which carry persistent currents for applying a biasing force on disk 76, and hence, rotor 74 for balancing static thrust loads. The other two coils, 80, 82 are provided for applying a dynamic force for balancing dynamic thrust loads. For this purpose, coils 80, 82 are connected to a PDI feedback system similar to the one shown in FIG. 3.

The active magnetic supercurrent bearings discussed are advantageous because they have controllable high stiffness and damping, reduced power consumption, and their ability to generate a bearing force at all speeds, even at rest.

As mentioned above, the superconducting coils of the bearings are preferably made of high temperature superconducting materials which are defined as materials having a critical transition temperature greater than 10° K.

Obviously numerous modifications can be made to the invention, without departing from its scope as described in the appended claims.

I claim:

1. An active magnetic bearing comprising:

a stator;

primary coil disposed on said stator, said primary coil means including a first and a second superconducting coil and a non-superconducting coil, said superconducting coil coupled to an external source for generating a stator current;

a rotor under a load including a static load component and a dynamic load component, said rotor being rotatable with respect to said stator; and secondary means axially symmetrically attached to said rotor and cooperating with said second superconducting coil to generate a biasing force on said rotor; said secondary means cooperating with said superconducting coil to generate a static force substantially symmetric about a longitudinal axis of said rotor for substantially counteracting said static load; said secondary means cooperating with said non-superconducting coil to generate a dynamic force to counteract said dynamic load;

said secondary means including means for generating a rotor current in response to said stator current.

2. The bearing of claim 1 wherein said rotor has a weight and said superconducting coil generates a support force for supporting said weight.

3. The bearing of claim 1 wherein said stator comprises a plurality of first and second poles, each said first pole supporting said superconducting coil and each said second poles supporting a non-superconducting coil.

4. The bearing of claim 1 further comprising vibration sensor means for sensing the vibrations of said rotor, and feedback control means coupled to said sensors for providing control signals to said primary coil means.

5. The bearing of claim 1 wherein said primary coil means and secondary means are spaced radially.

6. The bearing of claim 1 wherein said primary coil means and secondary means are spaced axially.

7. The bearing of claim 3 wherein said stator comprises a plurality of first and second poles, said first poles supporting said first and said second superconducting coils; and said second poles supporting said nonsuperconducting coil.

8. A bearing structure comprising:

an excitation source;

a stator with a superconducting stator coil coupled to said external excitation source to generate a stator current; and a rotor with a superconducting rotor coil, said rotor coil being arranged to produce a rotor current circulating in said rotor coil in response to said stator current;

wherein said superconducting rotor coil is symmetric about a longitudinal axis of said rotor;

wherein said stator and said superconducting rotor coil cooperate to generate a force therewithin substantially symmetric about a longitudinal axis of said rotor.

9. The structure of claim 8 wherein said stator and rotor are axially separated to counteract a thrust load on said rotor.

10. The structure of claim 8 wherein said rotor and stator coils are arranged to generate a repulsive force therebetween.

11. The structure of claim 8 wherein said coils are made of a high-temperature superconducting material.

* * * * *